Dec. 2, 1958  D. O. MITCHELL ET AL  2,863,036
ELECTRICALLY HEATED BUTCHERING KNIVES
Filed June 19, 1957  2 Sheets-Sheet 1

DONALD O. MITCHELL
RONALD A. CARBERY
INVENTOR.

BY James L. Girnan
ATT'Y

Dec. 2, 1958  D. O. MITCHELL ET AL  2,863,036
ELECTRICALLY HEATED BUTCHERING KNIVES
Filed June 19, 1957  2 Sheets-Sheet 2

DONALD O. MITCHELL
RONALD A. CARBERY
*INVENTOR.*

BY *James L. Firman*
ATTY 2,863,036
Patented Dec. 2, 1958

United States Patent Office

2,863,036
ELECTRICALLY HEATED BUTCHERING KNIVES

Donald O. Mitchell and Ronald A. Carbery, Portland, Oreg.

Application June 19, 1957, Serial No. 666,571

1 Claim. (Cl. 219—21)

This invention relates to improvements in butcher knives and more particularly to a knife heated by electricity and thereby particularly adapted for use in meat plants where heretofore knife blades used for trimming pork and the like in cold rooms were heated by immersion in steam pots to partake of the steam temperature and thus facilitate the trimming operations.

The present invention has for one of its principal objects the provision of a knife of the character described in which the knife blade is provided with a heating element extending substantially throughout its length and the provision of a rheostat contained within the knife handle for controlling the flow of electrical current to the heating element and its resultant sustained thermal output.

Another object of the invention is the provision of a knife blade of the character described wherein provision is made to radiate to both sides of the knife blade and to its cutting edge the maximum amount of heat emitted by the heating element carried by the knife blade.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
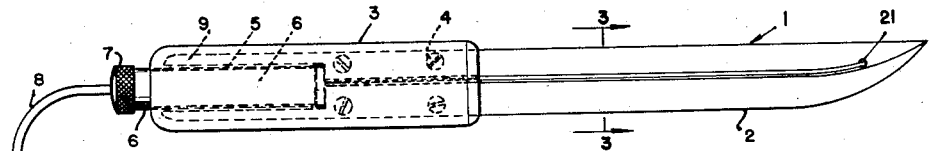
Figure 1 is a side view of a knife provided with a heating element and control means therefor in accordance with our invention.
Figure 2:
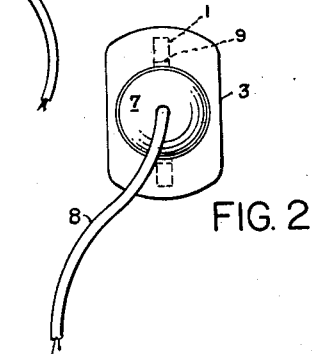
Figure 2 is a view on an enlarged scale of the left-hand end of Figure 1.

Referring now more particularly to the drawing:

The embodiment of the invention as illustrated in Figure 1 comprises a knife blade indicated by reference numeral 1 having the usual cutting edge 2. A handle 3 molded of any suitable dielectric material is secured to one end of the knife blade either by being molded therearound or, if desired, by screws 4 extending through both sides of the hand-grip and through the knife blade. The outer end of the handle is bored inwardly as at 5 to receive by a forced fit a rheostat 6 preferably of cylindrical form and provided with a control knob 7 at its outermost end. The rheostat is adapted by wires 8 to be connected in circuit with a source of electrical energy.

To provide maximum stability between the knife blade and the handle, the knife blade is bifurcated as at 9 to straddle the rheostat 8 so that the blade can extend substantially the full length of the handle.

Figure 8:
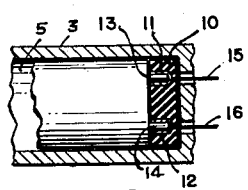
Figure 8 is a fragmentary sectional detail view on an enlarged scale of a rheostat and a receptacle for the electrodes of the rheostat.
Figure 3:
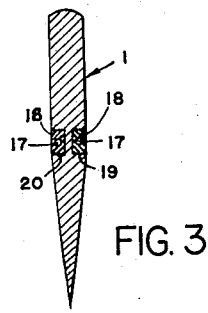
Figure 3 is a sectional end view on an enlarged scale, taken along the line 3—3 of Figure 1.

Within the bore 5 at the inner end thereof (see Figure 8) we secure a disc 10 of dielectric material by a forced fit. The disc is provided with a pair of electrode receptacles 11 and 12 adapted to receive the electrodes 13 and 14 respectively at the corresponding end of the rheostat. The receptacles 11 and 12 are connected respectively to the ends 15 and 16 of a suitable resistance wire 17 such as chrome, nickel alloy or the like. The wire is encased within porcelain cement 18 or other suitable heat-radiating electrical insulation. The cement is embedded within grooves 19 and 20 extending along both sides of the knife blade 1 substantially throughout its length and extends through an aperture 21 in the knife blade near its pointed end.

From the foregoing it will be apparent that the knife blade can be heated by the wire 17 to any desired degree of temperature throughout its length and width in accordance with the setting of the rheostat 6.

Figures 4, 4A:
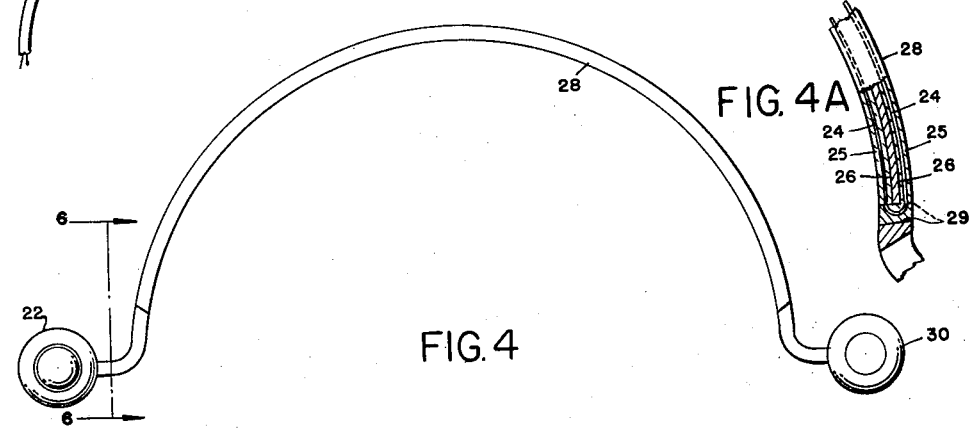
Figure 4 is a front view of a draw-knife provided with a heating element and control means therefor in accordance with our invention.
Figure 4A is a fragmentary sectional detail view on an enlarged scale of a portion of the right-hand end of the blade of the draw-knife of Figure 4.
Figure 5:
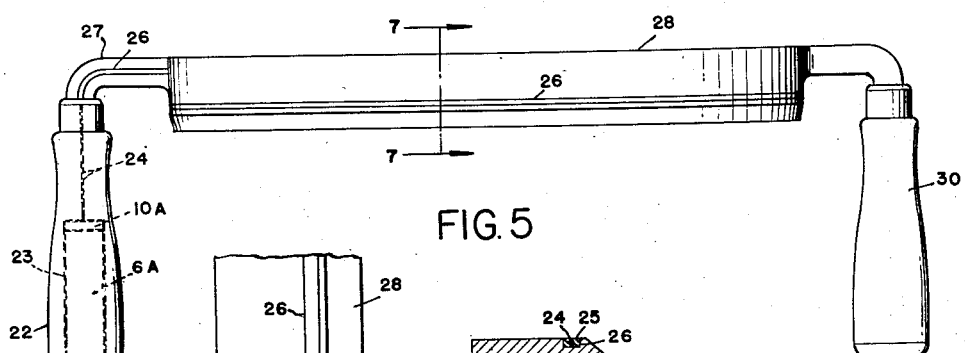
Figure 5 is a top plan view of Figure 4.
Figures 6, 7:
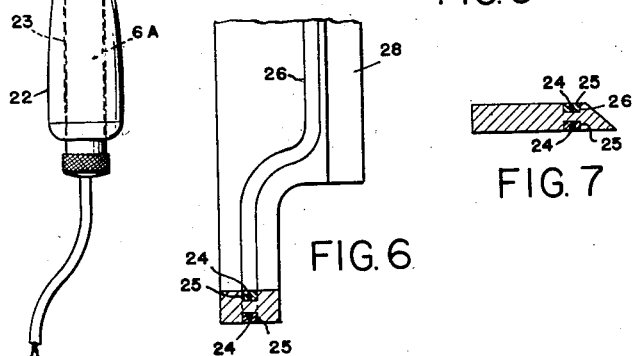
Figure 6 is an enlarged fragmentary sectional view on an enlarged scale, taken along the line 6—6 of Figure 4.
Figure 7 is a sectional view on an enlarged scale, taken along the line 7—7 of Figure 5.

In the modification of the invention shown in Figures 4 and 5 as applied to a draw-knife, one handle 22 of the knife, which may be either on the left-hand or the right-hand end, as desired, is bored inwardly from its outer end as at 23 to provide a housing for a rheostat 6A of the type shown and described in connection with Figure 1. This rheostat is electrically connected through the plug receptacle disc 10A to the ends of a resistance wire 24 in the same manner as described in connection with Figure 8. The wire is encased within porcelain cement or the like as indicated at 25 (see Figures 6 and 7) embedded within grooves 26 formed in and along both sides of the handle-engaging portion 27 and along both sides of the arcuate blade 28 of the draw-knife. The wire and porcelain cement extend through an opening 29 (see Figure 4A) in the blade 28 near the opposite handle 30 so that the blade will be heated throughout its length and width to a temperature controlled by the setting of the rheostat 6A.

Figure 9:
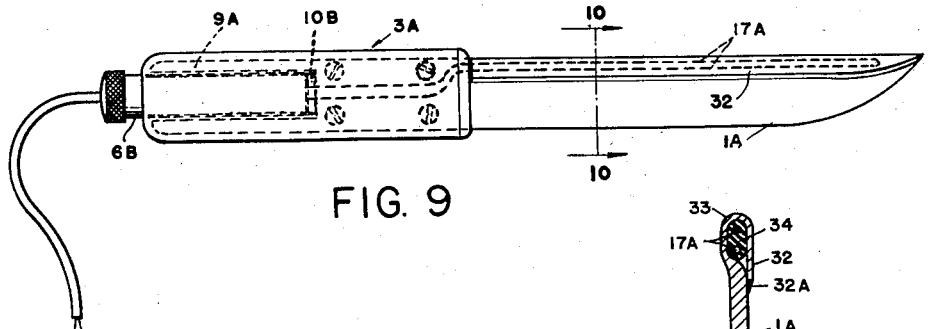
Figure 9 is a side view of a modification of the knife shown in Figure 1.
Figure 10:
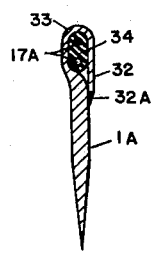
Figure 10 is a sectional view on an enlarged scale taken along the line 10—10 of Figure 9.

In the further modification shown in Figures 9 and 10 the handle 3A, rheostat 6B, plug receptacle disc 10B and bifurcated end 9A of the knife blade 1A are identical with those shown and described in Figure 1. Forwardly from the handle 3A the knife blade 1A is folded over on itself as at 32 and welded as at 32A to provide a hollow tubular portion 33 throughout its length. Resistance wire 17A is in circuit with the rheostat 6B through the medium of the plug receptacle disc 10B and is embedded within porcelain cement 34 encased within and extending the full length of the tubular portion 33 of the knife blade whereby the knife blade will partake of the temperature of the resistance wire 17A in accordance with the setting of the rheostat 6B.

While we have shown particular forms of embodiment of our invention we are aware that many minor changes therein will readily suggest themselves to others skilled in the art without departing from the spirit and scope of the invention. Having thus described our invention what we claim as new and desire to protect by Letters Patent is:

A knife of the character described including a handle having a bore extending inwardly from one of its ends and thereby adapted to receive a rheostat, a knife blade bifurcated at one of its ends and thereby secured within said handle with the bifurcation straddling said bore, said knife blade extending outwardly from the handle and having an opening therethrough near its end opposite from the handle, said blade having a groove along each of its sides substantially throughout its length, both of said grooves being in communication with each other through said opening, heat-radiating dielectric material embedded within said grooves and within said opening, a continuous heating element encased within said dielectric material throughout the length thereof on both sides of the blade through said opening and terminating within said bore in the handle and thereby adapted for electrical connection to a source of electrical energy.

References Cited in the file of this patent

UNITED STATES PATENTS

| | | |
|---|---|---|
| 1,160,754 | Poore | Nov. 16, 1915 |
| 1,658,884 | Cusick | Feb. 14, 1928 |
| 2,032,688 | Dart | Mar. 3, 1936 |
| 2,110,985 | Jacobson | Mar. 15, 1938 |
| 2,448,577 | Chiarotti | Sept. 7, 1948 |
| 2,623,977 | Weiskopf | Dec. 30, 1952 |

FOREIGN PATENTS

| | | |
|---|---|---|
| 1,107,332 | France | Aug. 3, 1955 |